(12) United States Patent
Balasini et al.

(10) Patent No.: US 9,776,428 B2
(45) Date of Patent: Oct. 3, 2017

(54) MULTI-PURPOSE PRINTER

(71) Applicant: OLIVETTI S.p.A., Ivrea (TO) (IT)

(72) Inventors: Flavio Balasini, Ivrea (IT); Paolo Poma, Ivrea (IT); Claudio Vernetti, Ivrea (IT)

(73) Assignee: SHENZHEN PU YING INNOVATION TECHNOLOGY CORPORATION LIMITED, Shenzhen (CN)

( * ) Notice: Subject to any disclaimer, the term of this patent is extended or adjusted under 35 U.S.C. 154(b) by 0 days.

(21) Appl. No.: 14/655,264

(22) PCT Filed: Dec. 28, 2012

(86) PCT No.: PCT/EP2012/077050
§ 371 (c)(1),
(2) Date: Jun. 24, 2015

(87) PCT Pub. No.: WO2014/101951
PCT Pub. Date: Jul. 3, 2014

(65) Prior Publication Data
US 2015/0314612 A1    Nov. 5, 2015

(51) Int. Cl.
*G06F 15/00* (2006.01)
*B41J 3/28* (2006.01)
(Continued)

(52) U.S. Cl.
CPC ............ *B41J 3/283* (2013.01); *B41J 13/009* (2013.01); *B41J 13/0045* (2013.01);
(Continued)

(58) Field of Classification Search
CPC ....................................................... B41J 3/283
(Continued)

(56) References Cited

U.S. PATENT DOCUMENTS

| 5,341,202 A | 8/1994 | Isobe |
| 5,613,783 A * | 3/1997 | Kinney ............ B41J 11/48 235/439 |

(Continued)

FOREIGN PATENT DOCUMENTS

WO       97/45272 A1    12/1997

OTHER PUBLICATIONS

Machine translation of WO 97/45272, Girod, Raoul, Apr. 12, 1997.*
International Search Report of PCT/EP2012/077050 dated Sep. 26, 2013.

*Primary Examiner* — Mark Milia
(74) *Attorney, Agent, or Firm* — Venable LLP; Jeffri A. Kaminski

(57) ABSTRACT

It is disclosed a printer comprising a front opening through which one or more documents to be treated could be introduced therein, wherein the printer comprises a first path for transporting said one or more documents from a first position to a second position and back to the first position; wherein the printer further comprises a second path for transporting said one or more documents from said first position to an exit, wherein said second path comprises a flap for deviating said one or more documents towards said exit and a separator for directing the one or more documents to one of a first tray and a second tray.

16 Claims, 8 Drawing Sheets

(51) Int. Cl.
  *G06K 15/02* (2006.01)
  *G06K 15/16* (2006.01)
  *B41J 13/00* (2006.01)

(52) U.S. Cl.
  CPC .......... *G06K 15/021* (2013.01); *G06K 15/16* (2013.01); *G06K 2215/0097* (2013.01); *H04N 2201/0094* (2013.01)

(58) Field of Classification Search
  USPC ....................................................... 358/1.12
  See application file for complete search history.

(56) References Cited

U.S. PATENT DOCUMENTS

| | | | |
|---|---|---|---|
| 2008/0291230 A1 | 11/2008 | Na | |
| 2009/0014943 A1* | 1/2009 | Sasaki | B65H 1/025 271/10.09 |
| 2012/0320128 A1* | 12/2012 | Kumazaki | B41J 25/3088 347/37 |

* cited by examiner

MULTI-PURPOSE PRINTER

The present invention relates to a multi-purpose printer or the like which is configured for managing several types of documents and/or for managing documents in a different way.

In the present description and claims the term "printer" should be intended as including any peripheral device to be connected (by any means, such as through a cable, a wireless link, an infrared link or the like) to a computer, a personal computer, a smart phone or the like and configured for managing sheets. Examples of "printer" are: a printer for printing one single sheet of paper or a plurality of sheets of paper possibly connected together; a printer for printing one or more sheets of a material other than paper; a scanner, a facsimile machine or a peripheral incorporating two or more of the above functionalities.

In the art, several different designs of printers are known. The difference being at least in the printing technology (laser printing, ink-jet printing, dot-matrix printing, . . . ) and/or in the main intended use (domestic use, small office use, large companies use, . . . ). Printers which are designed for private use or use by a rather reduced number of people as in a small office are generally rather compact in size because they are intended to be supported on a desk or table in proximity of the computer of the user.

The present description will refer more specifically to printers designed for use in a bank, post office or the like. The above specific reference to the bank (including post office) environment is not intended to limit the scope of protection in no way and the present invention is equally applicable to printers to be used in any other private or business environment.

Typically, a bank clerk has to print a receipt or the like which confirms a certain corresponding transaction. For instance, he has to print a receipt for a money transfer order which has been performed. Possibly, this receipt is printed into two copies, one for the bank and one for the client who gave the instruction.

SUMMARY OF THE INVENTION

The Applicant has noticed that the present practice in a bank includes further operations which have to be carried out by a clerk.

It may be further requested to print characters and/or digits on checks or the like.

It may be further requested to validate a document or scan a document.

Furthermore, identity of a person should be detected based on a corresponding identity card or the like.

In view of the above, the Applicant has tackled the problem of providing a multi-purpose printer which could be used for performing different activities in a private or business environment, for instance in a bank or post office environment.

In particular, the Applicant has tackled the problem of providing a multi-purpose printer which can manage different types of documents and/or can operate in a plurality of ways on documents.

The Applicant has observed that operation of a printer may be improved by providing at least two paper paths. The first paper path is intended for a first operation mode; and the second paper path is intended for a second operation mode.

The first operation mode may comprise managing a first type of document and/or carrying out certain first operations on document. The second operation mode may comprise managing a second type of document and/or carrying out certain second operations on document.

According to a first aspect, the present invention relates to a printer comprising a front opening through which one or more documents to be treated could be introduced therein, wherein the printer comprises a first path for transporting said one or more documents from a first position to a second position and back to the first position; wherein the printer further comprises a second path for transporting said one or more documents from said first position to an exit, wherein said second path comprises a flap for deviating said one or more documents towards said exit and a separator for directing the one or more documents to one of a first tray and a second tray.

The flap is preferably movable from a first position to a second position responsive to a signal.

The signal may be a signal from anyone of a magnetic reader, an upper scanner, a lower scanner, a watermark reader or any combination thereof. In other embodiments, the signal may also be a signal from a user command.

The separator is preferably movable from a first position to a second position responsive to a further signal.

The further signal may be a signal from anyone of a magnetic reader, an upper scanner, a lower scanner, a watermark reader, or any combination thereof. In other embodiments, the further signal may also be a signal from a user command.

The printer may comprise a control unit configured for receiving signals and emitting a signal to a command device.

The first path may be substantially horizontal and said second path may comprise a part of said first path.

The second path is configured so that said one or more documents is inclined with respect to said first path.

In embodiments of the invention, the exit is arranged in an upper portion of the printer.

In embodiments of the invention, the first path comprises a back opening for allowing a front part of a document to exit from the printer when the document is at or in proximity of the second position.

In embodiments of the invention, the printer further comprises an automatic document feeder.

In embodiments of the invention, the printer further comprises an aligning device and a paper sensor.

In embodiments of the invention, the printer comprises a dot-matrix printing head.

BRIEF DESCRIPTION OF THE DRAWINGS

Embodiments of the present invention will be better understood by reading the following detailed description, to be read by referring to the accompanying drawings, wherein.

DETAILED DESCRIPTION OF PREFERRED EMBODIMENTS OF THE INVENTION

Figure 1:
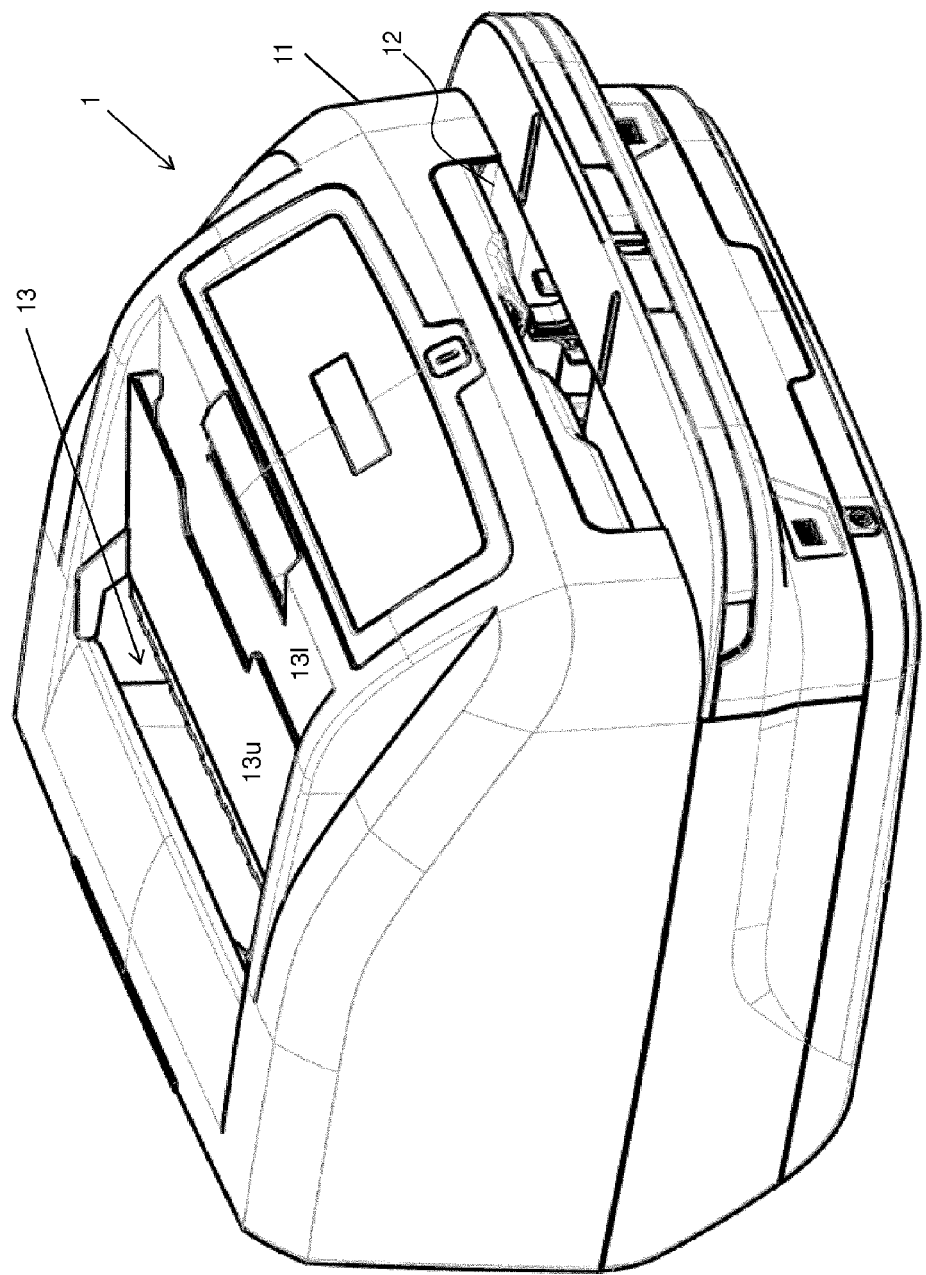
FIG. 1 is a view of a printer according to an embodiment of the present invention.

FIG. 1 schematically shows a printer 1 according to an embodiment of the present invention. The printer 1 comprises a main body 11. The printer comprises a feeding opening 12 for feeding one or more documents D to the printer and an upper output paper tray 13.

For the present description and claims, the term "document" will indicate a layer of material to be treated. Such a layer of material may comprise one or more sheets. Possibly, such one or more sheets comprise paper or paper board. The sheet(s) may be connected together or can be separated. The sheet(s) may be at least partially pre-printed or may be "white" sheets (without any characters and digits thereon).

Figure 2:
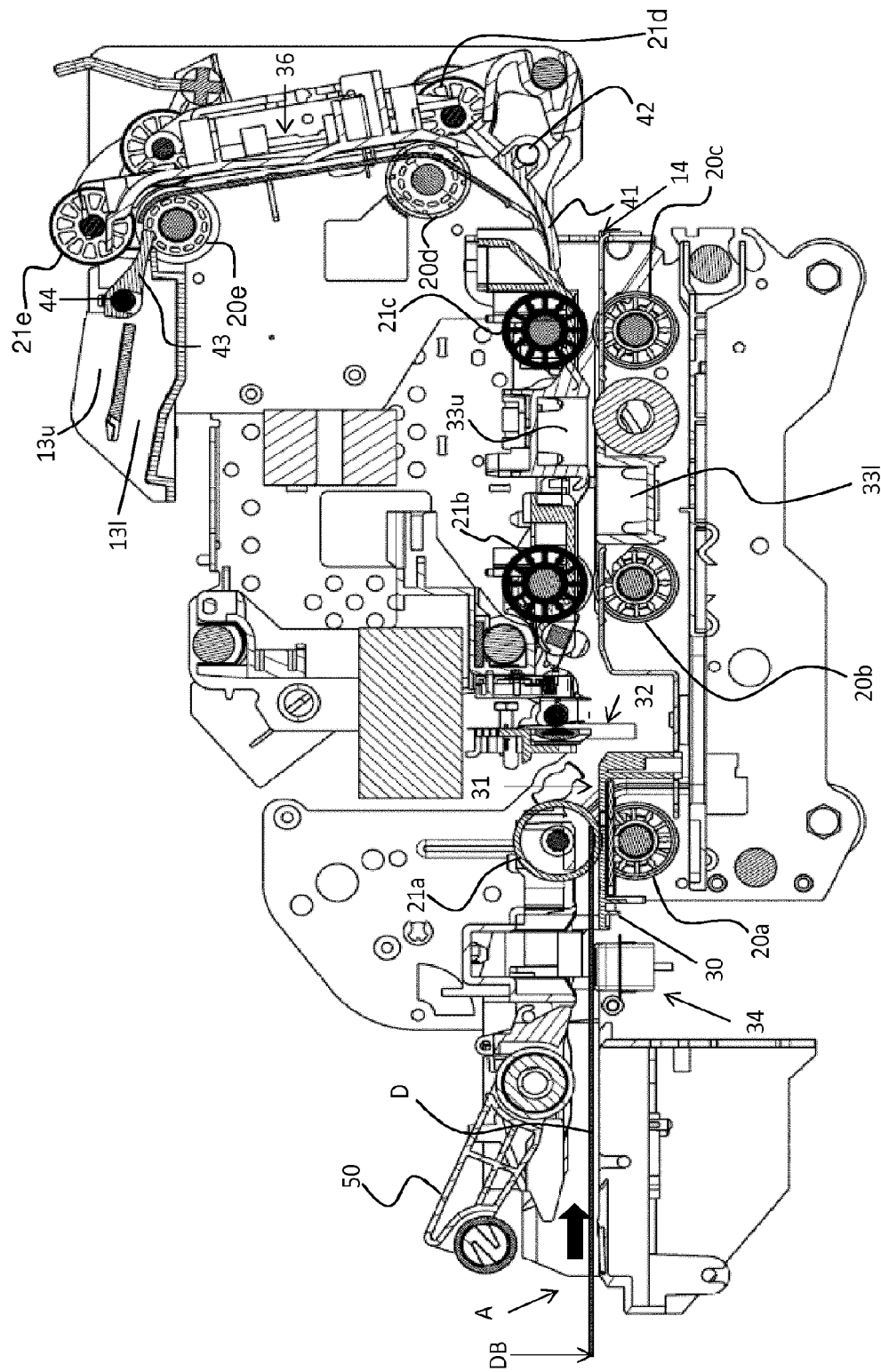
FIG. 2 is a simplified cross section of the printer of FIG. 1, arranged in a first operation mode, with a document which is at about the beginning of the paper path.
Figure 3:
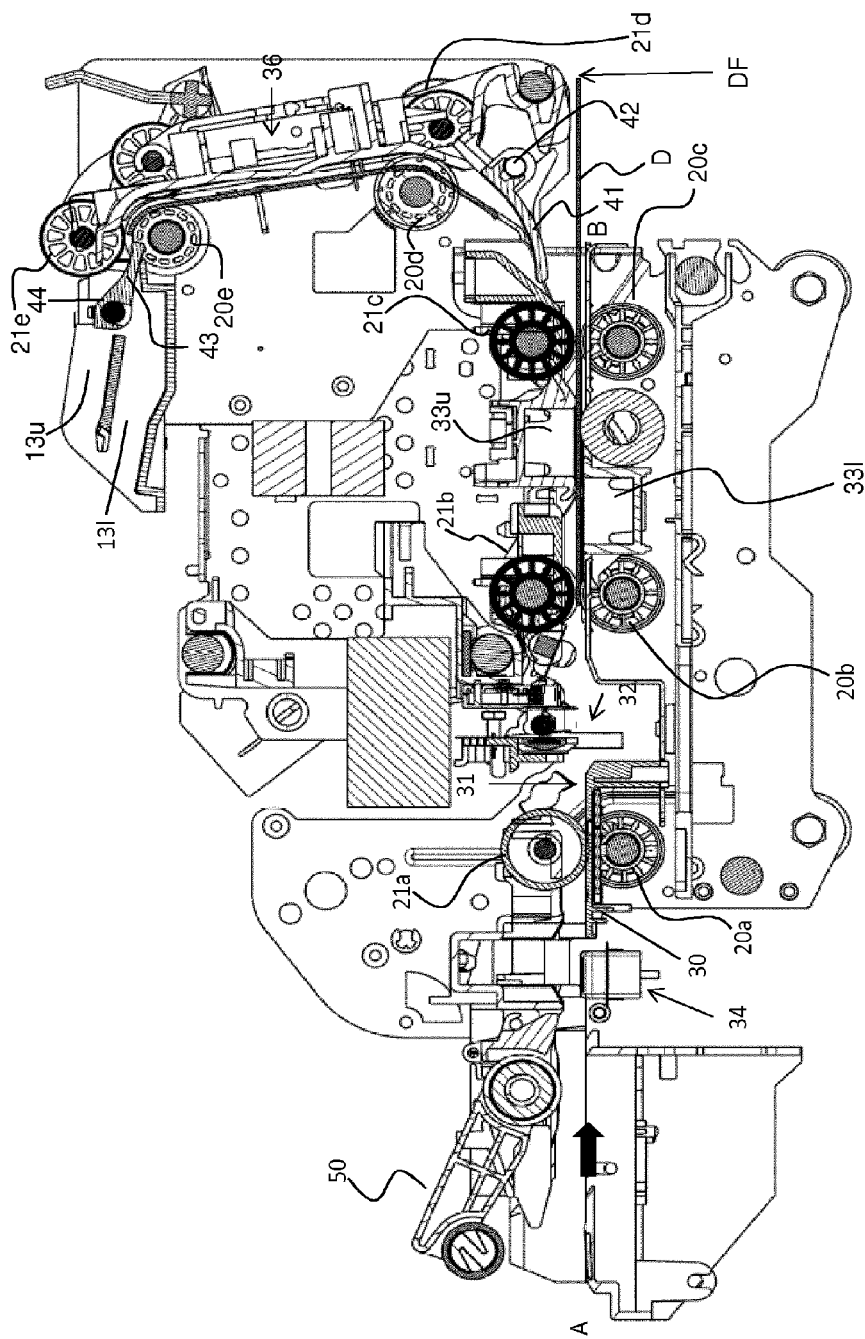
FIG. 3 is a simplified cross section of the printer of FIG. 1, arranged in the first operation mode, with the document which is at an intermediate position of the paper path.
Figure 4:
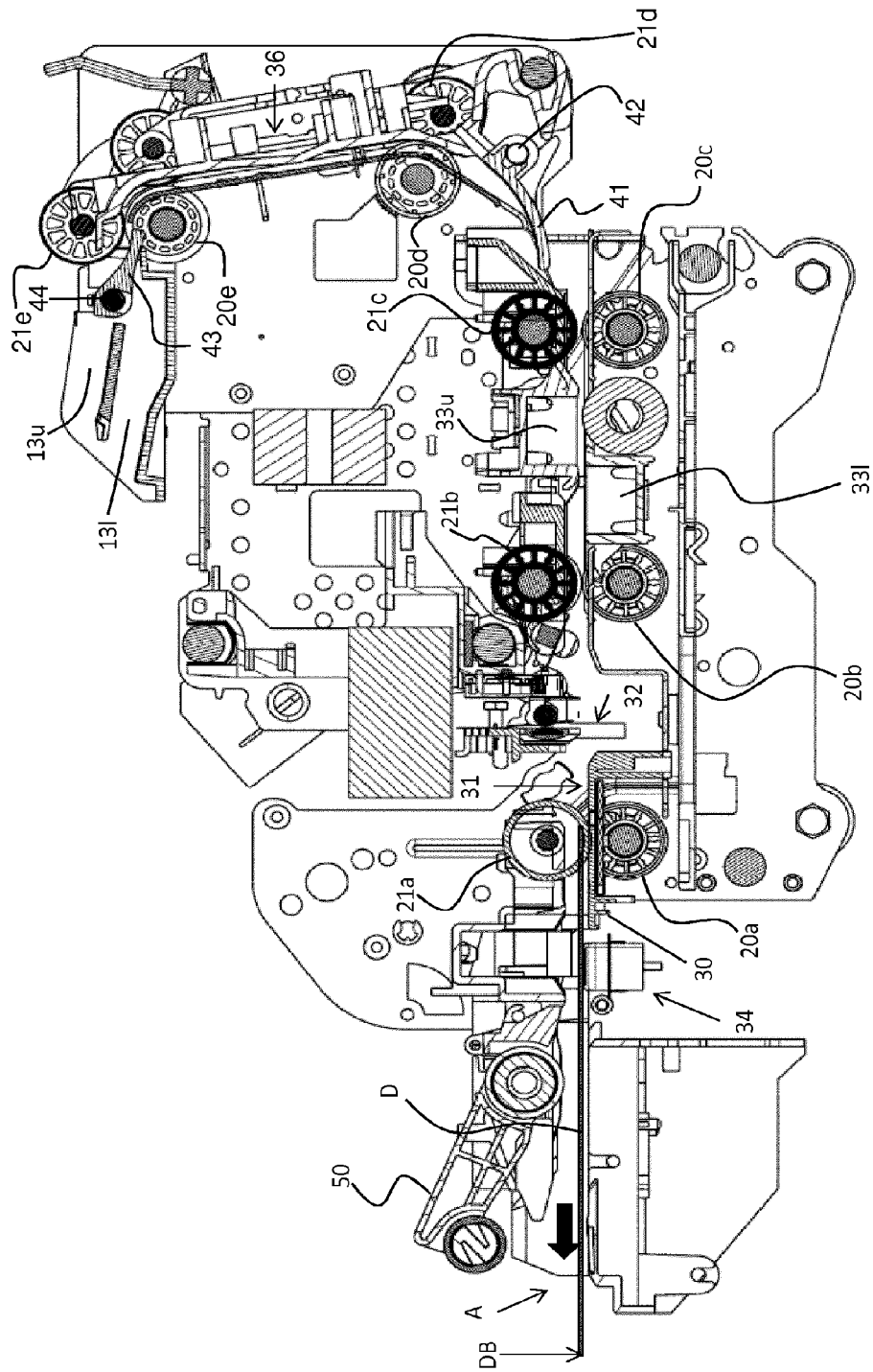
FIG. 4 is a simplified cross section of the printer of FIG. 1, arranged in the first operation mode, with the document which is at about the end of the paper path.

FIGS. 2 to 7 are simplified cross sections of a printer according to one embodiment of the present invention. More in particular, FIGS. 2 to 4 show the first operation mode and the remaining Figures show the second operation mode.

First operation mode may comprise managing a first type of document. For instance, a document to be managed in the first operation mode is a passport, which typically comprises a rather hard cover and a plurality of rather thick pages protected by the cover in a book arrangement. It may be necessary for a bank clerk to identify a person by reading information printed on a page of the passport. Another document to be managed in the first operation mode is a passbook, which also typically comprises a cover and a number of pages where transactions are annotated. It may be necessary to print information about a new transaction and/or reading details of previous transactions and of the proprietor of the passbook. Another document to be possibly managed in the first operation mode is a paper form which should be printed with details of a certain transaction and immediately returned to the client.

Second operation mode may comprise managing a second type of document or carrying out certain operations on documents. For instance, it may be necessary in a bank environment to verify checks and placing positively verified checks in a location for valid checks and negatively verified checks in a separate location for invalid checks. A plurality of checks could be arranged at the entrance of the printer and verified in an ordered sequence.

The printer 1 comprises a number of driving rollers 20*a*, 20*b*, 20*c* and corresponding pressure rollers 21*a*, 21*b* and 21*c*. The driving rollers 20*a*, 20*b*, 20*c* could also be referred to as 20. Similarly, the pressure rollers 21*a*, 21*b* and 21*c* could also be referred to as 21. In the embodiment which is shown in the Figures, the number of driving rollers and corresponding pressure rollers for the first paper path is three but such a number could be higher or lower.

The three driving rollers 20*a*, 20*b*, 20*c* are preferably arranged in such a way that their rotation axis lies on a single plane in order to transport the document D along a substantial horizontal plane. Driving rollers 20 are connected to one single electric motor or to a number of electric motors through gears, belts, chains or a combination thereof as it is known to a man skilled in the art. Preferably, the movement of the driving rollers 20 is coordinated so that they rotate together at the same speed.

Preferably, the pressure rollers 21 are rotated by friction with the driving rollers 20.

The rollers 20, 21 could be at least partially flexible for accommodating documents D of different thickness. As an alternative, the ends of the rollers 20, 21 could be arranged on elastic supports for the same purpose of accommodating documents of different thickness (for instance a passport and a single thin sheet of paper). The rollers 20, 21 could comprise a single cylinder body or a number of short cylinders connected by a single axle.

Preferably, the rollers 20, 21 can be rotated both in one direction (for transporting the document D in a first travel direction, from A to B) and in the opposite direction for transporting the document D back to the starting point (from B to A, namely in proximity of feeding opening 12).

Upstream of the first assembly of driver and pressure rollers 20*a*-21*a*, a paper sensor 30 is preferably provided for detecting presence of a document D (which could be either a passport or a single thin sheet of paper or any other layer of material).

Preferably, downstream of the first assembly of driver and pressure rollers 20*a*-21*a*, an aligning device 31 is provided. The aligning device is provided for arranging the front edge DF of the document D aligned and substantially parallel to the axis of the further rollers. This results in the fact that the document D is, from that point, transported according to the proper orientation and therefore reading of characters or digits, as well printing is done in the best manner.

A printing head 32 is also preferably arranged in a position downstream the first assembly of driver and pressure rollers 20*a*-21*a*. In the embodiment of the Figures, the printing head 32 is between the first assembly of driver and pressure rollers (20*a*-21*a*) and the second assemblies of driver and pressure rollers (20*b*-21*b*).

The printing head 32 may comprise a laser printing head, a ink-jet printing head, a dot-matrix printing head or any combination thereof. In one preferred embodiment which is deemed to be adapted to bank environment, the printing head comprises a dot-matrix printing head.

The printer 1 of the present invention may comprise a scanner device 33 for scanning the document D to be managed in the printer. According to the embodiment which is shown in the figures, the scanner device comprises an upper scanner 33*u* and a lower scanner 33*l* for scanning an upper surface of the document and a lower surface of the document, respectively. In other embodiments either the upper scanner 33*u* or the lower scanner 33*l* could be provided.

Advantageously, the printer 1 may comprise further detection/reading devices. For instance, it may comprise a magnetic reader 34 and/or a watermark reader 36. Watermark reader could comprise a UV (Ultra Violet) sensor, in order to detect UV images and/or alterations of the documents (for instance checks). While the watermark reader in the embodiment shown in the figures is arranged downstream the rollers 20*a*-21*a*, 20*b*-21*b*, 20*c*-21*c*, it may be arranged in any other position.

In the embodiment shown in the figures, the magnetic reader 34 is arranged upstream of the first assembly of driver and pressure rollers 20*a*-21*a*. The magnetic reader 34 may comprise a head which is mounted on a sliding carriage (not shown in details). In a first passage of the head, the magnetic reader 34 magnetizes characters and/or digits on the document D (which is typically a bank check or the like). In a second passage of the head, the magnetic reader 34 reads the previously magnetized characters and/or digits.

Preferably, downwardly of the third assembly of driver and pressure rollers 20c-21c a back opening 14 is provided. As it will be clear afterwards, the back opening 14 is provided for accommodating a front part of the document D which has reached the end of the first path, before being transported back to the entrance 12. Thanks to the presence of the back opening 14, a complete scanning of the document D can be provided. In other words, the upper and lower scanners 33u, 33l can scan also the area of the document D which is close to the rear edge DR of the document (the front edge DF of the document went out of the printer 1 through the back opening 14).

The first path comprises a path from the feeding opening 12 (point A) to the more extreme opposite position (point B), wherein the document D is arranged between the rollers of the third assembly of driver and pressure rollers 20c-21c (FIGS. 2 and 3) and back to the feeding opening 12 (point A, FIG. 4). The operation of the printer 1 as far as the first path is concerned will be further described below.

According to the present invention a flap 41 is provided downward the third assembly of driver and pressure rollers. The flap 41 is in the form of a curved plate which can be rotated about a rotation axis 42.

Figure 5:
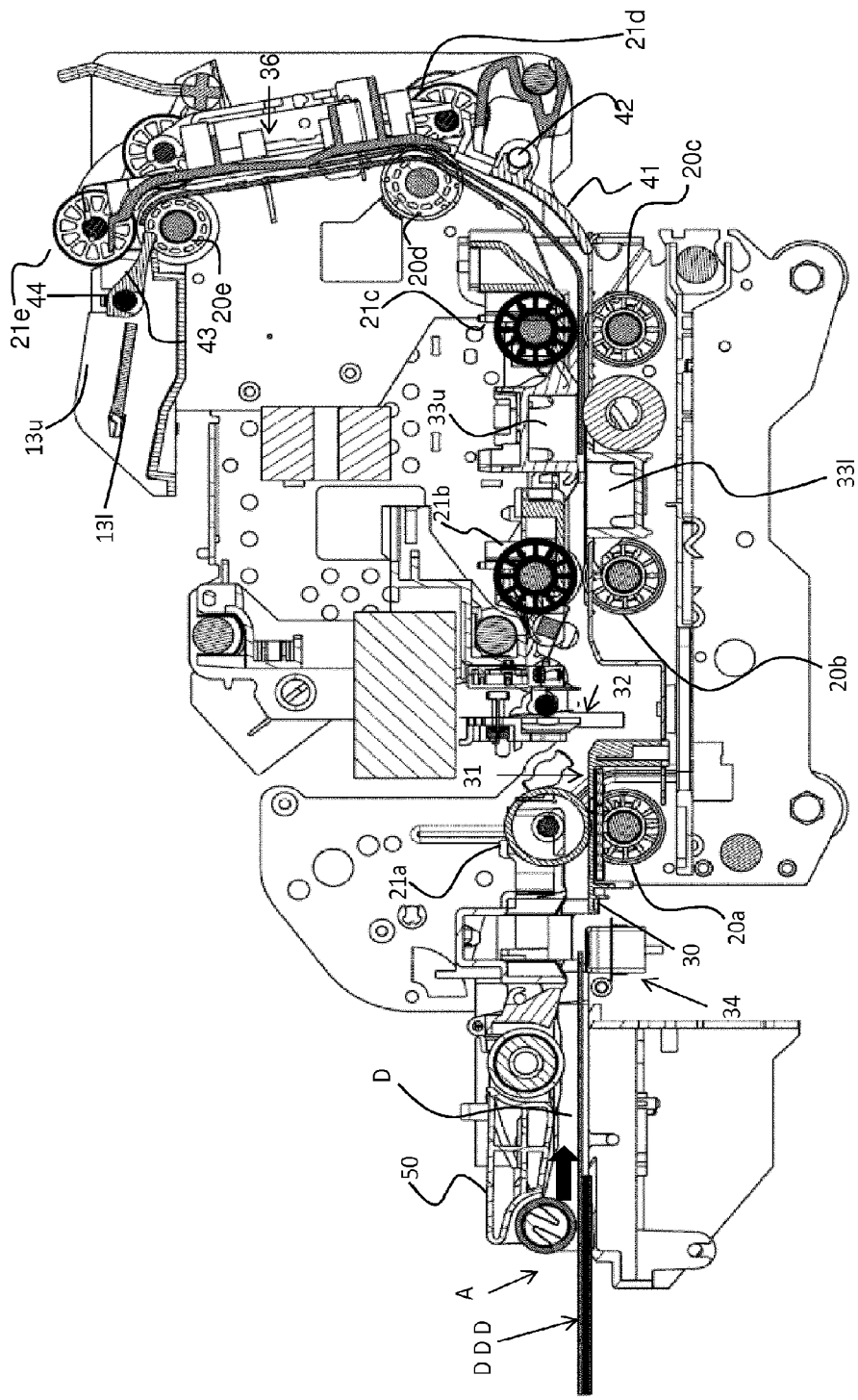
FIG. 5 is a simplified cross section of the printer of FIG. 1, arranged in a second operation mode, with the document which is at about the beginning of the paper path.
Figure 6:
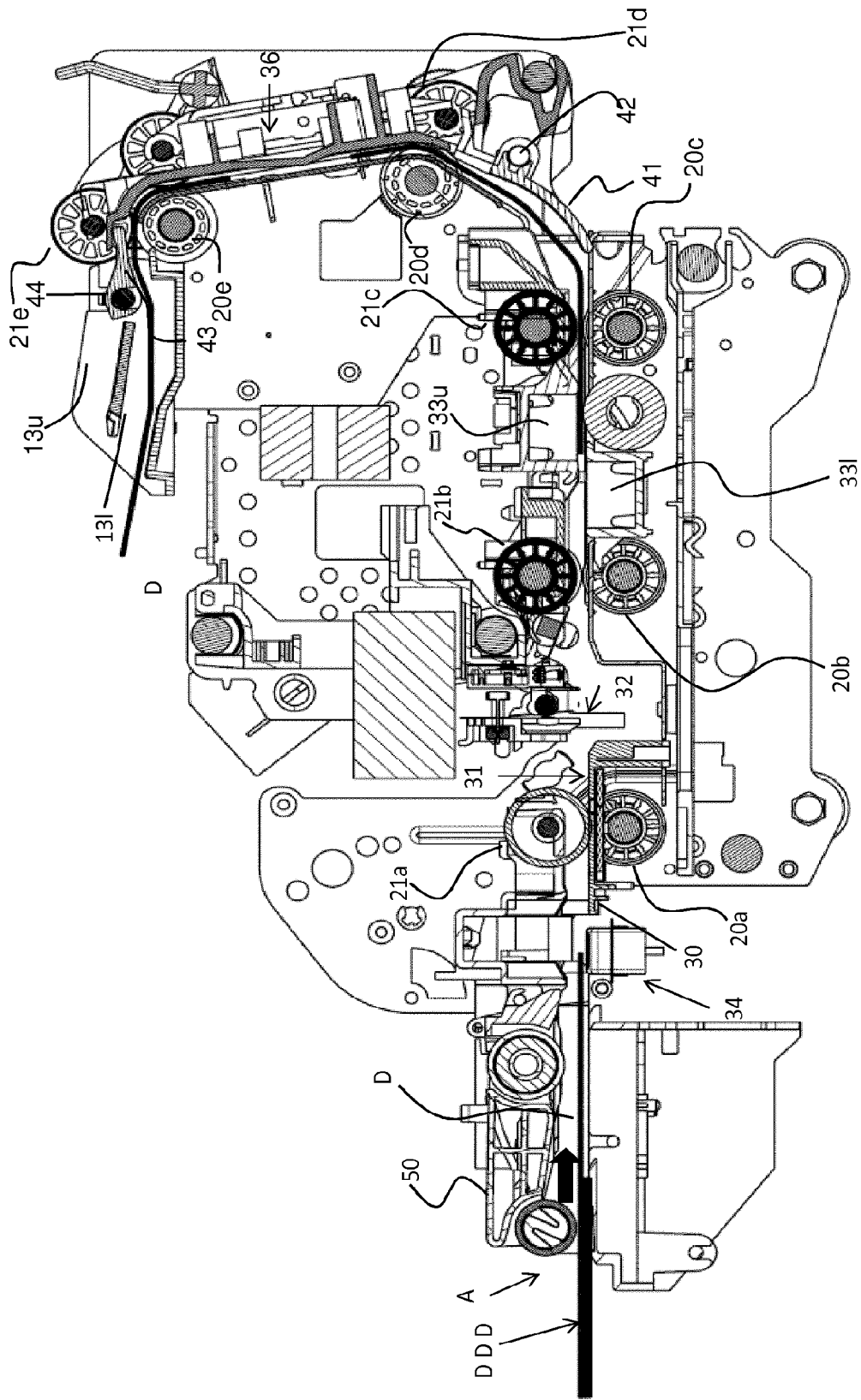
FIG. 6 is a simplified cross section of the printer of FIG. 1, arranged in the second operation mode, with the document which has reached one first end of the paper path.
Figure 7:
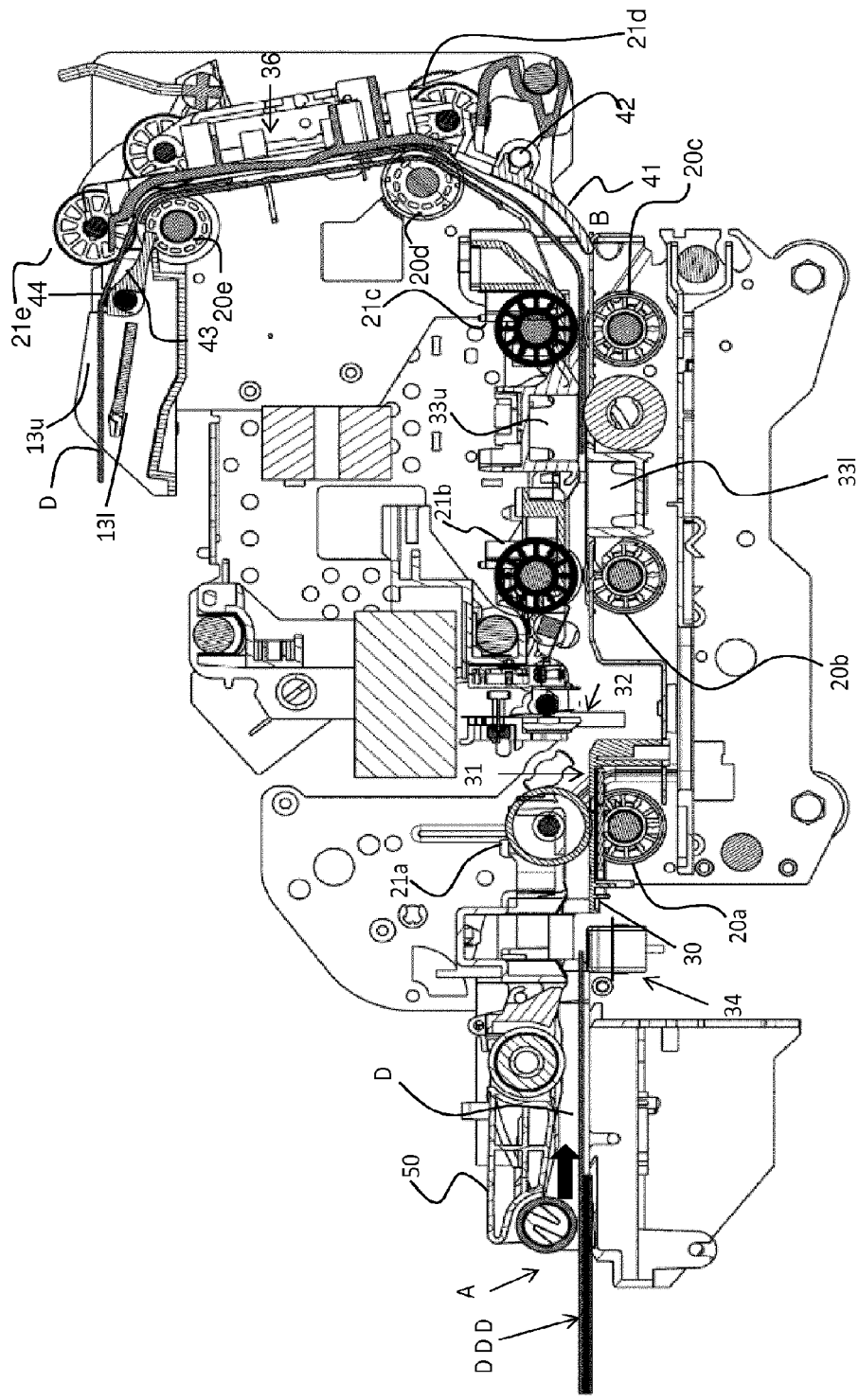
FIG. 7 is a simplified cross section of the printer of FIG. 1, arranged in the second operation mode, with the document which has reached one second end of the paper path.

FIGS. 2, 3 and 4 show the flap 41 in the first position. When the flap 41 is in the first position, a document D can not travel in the second path (to be disclosed). As said above, with the flap 41 in the first position, the document D can partially exit from the back opening 14 for allowing complete scanning and/or writing thereof. On the contrary, when the flap 41 is in a second position, a document D is forced to travel through the second path. This mode is shown in FIGS. 5 to 7.

Preferably, according to the present invention, two further assemblies of driver and pressure rollers 20d-21d, 20e-21e are provided for guiding the document along the end part of the second path. Each of the two further roller assemblies may comprise a driver roller (20d, 21d) and a corresponding pressure roller (20e-21e) which is preferably rotatable by friction with the driver roller. Preferably, the two further roller assemblies 20d-21d, 20e-21e are configured for transporting documents towards the upper output paper tray 13 but they are not configured for driving back the documents.

In embodiments of the invention, a watermark reader 36 is arranged between the two further roller assemblies 20d-21d, 20e-21e.

According to preferred embodiments, a paper separator 43 is provided in proximity of the upper output paper tray 13 of the printer 1. The paper separator 43 is rotatable about a corresponding rotation axis 44. The paper separator 43 can be arranged in at least two positions. The upper output paper tray 13 can be divided into at least two corresponding tray sections 13u (upper try section), 13l (lower try section). In this manner, the documents coming from the second paper path can be collected in the first tray section 13u or in the second tray section 13l.

The rotation of the paper separator 43 can be driven by a signal coming from anyone of the magnetic reader 34, the upper scanner 33u, the lower scanner 33l, the watermark reader 36 or any combination thereof. In some embodiments, rotation of the paper separator can be caused by the user (printer operator) who selects second mode (corresponding to second paper path). Further details of the operation will be given below.

Similarly, the rotation of the flap 41 can be driven by a signal coming from anyone of the magnetic reader 34, the upper scanner 33u, the lower scanner 33l, a watermark reader or any combination thereof. In some embodiments, rotation of the paper separator can be caused by the user (printer operator) who decides to operate the printer according to one of the two possible modes.

Figure 8:
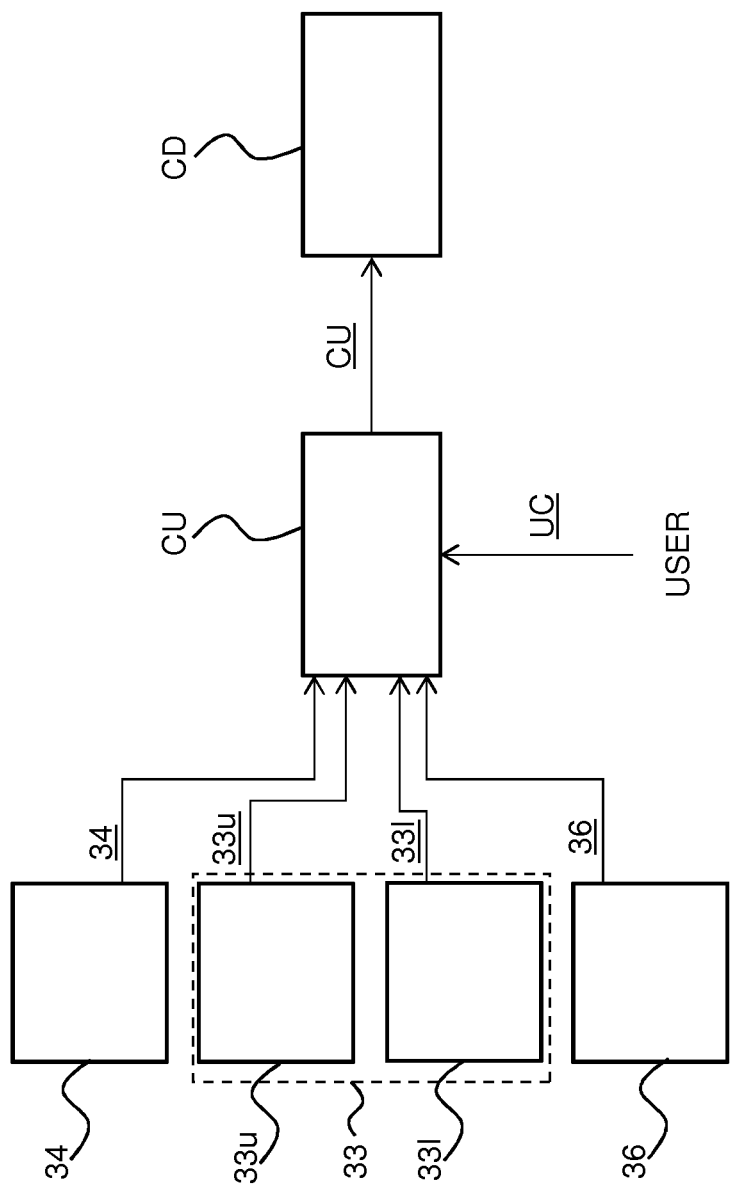
FIG. 8 is a block diagram of a control unit and a command device for rotating a flap and/or a paper separator.

FIG. 8 is a block diagram showing the magnetic reader 34, the scanner 33 (possibly subdivided into an upper scanner 33u and a lower scanner 33l) and watermark reader 36. Each of them is capable of emitting a corresponding signal 34, 33u, 33l, 36 to a control unit CU. Control unit CU can be driven by one or more of the above mentioned signals, including a UC (user command) signal given directly by a user through a button or any other command means. Control unit CU elaborates the received signal(s) and emits a command signal CU to a command device CD.

Control unit may comprise a microprocessor or the like. In one embodiment, the control unit CU is at least partially comprised in the printer. In other embodiments, the control unit may be a logical unit , such as a software program running on a personal computer (not shown) connected to the printer.

Command device CD may comprise one or more electric motors or the like for rotating the paper separator 43 to one of the two operating positions and/or the flap 41.

In preferred embodiments, the printer 1 further comprises an automatic document feeder, ADF, 50. The automatic document feeder 50 is preferably arranged in proximity of the feeding opening and is arranged for taking single documents from a stake of documents D and feeding the single documents to the printer 1. For instance, a number of checks, arranged in an ordered stake can be disposed at the entrance of the printer. The automatic document feeder takes first the upper check from the stake and feeds it to the arrangements of rollers of the horizontal path. Then, it takes the other checks, always starting from the upper check of the remaining checks of the stack.

Here below the operation of the printer 1 in the first mode will be described.

FIG. 2 shows a document D at the entrance of the printer 1. This position corresponds to about the beginning of the first paper path. As said above, the first paper path is about a horizontal path because the document D travels in a substantially horizontal arrangement. The document D is shown as a rather thick layer for better understanding of the operation of the printer. However, the document may also be thinner.

Typically, the document D is positioned by the user up to a starting position. Then the user activates the printer 1 in the first mode by pressing a proper button (not shown) or in any known means. Alternatively, the printer starts in the first mode based on certain detections (for instance, type of document, size of document, material of the document, position of the document or a combination thereof).

Preferably, in the first mode, the automatic document feeder 50 is raised and is not working.

In the first mode, the document D starts at point A and is taken between the first roller arrangement 20a-21a, the second roller arrangement 20b-21b and the third roller arrangement 20c-21c. During the travel of the document, it is preferably aligned. During the travel of the document D, it is preferably subject to scanning through the upper and/or the lower scanners 33u, 33l. In some embodiments, during the travel of the document D, it is preferably subjected to a magnetic reading (see 34).

FIG. 3 shows the document D at point B, namely before starting the travel back to the feeding entrance 12. In this position, the document D is maintained between the rollers 20c, 21c of the third roller arrangement. In this position, the front edge DF of the document D is out of the printer 1. This allows the area close to the back edge DB of the document D to be scanned or otherwise treated.

When all the operations (either printing and/or scanning and/or reading operations) have been completed, the document D is transported back towards the entrance by the third roller assembly 20c-20d, the second roller assembly 20b-21b and the first roller assembly 20a-21a. The document D becomes available to the user who can take it out from the printer 1. Typically, the document D after the above operations is stored by the user in a different location or is given back to the client. FIG. 4 shows the document D at the end of the first paper path when it is at point A again.

As said above, the first operation mode is adapted to single documents which have to be given back to the client or have not to be stored. It is particularly adapted to thick documents which can not be curved easily. Examples of these documents are passports, passbooks or receipts of bank transactions.

Here below, the operation of the printer in the second mode will be disclosed with reference to FIGS. 5 to 7.

A stack of documents D D D is arranged (FIG. 5). Typically, the operation in the second mode starts when the user starts a proper button. In other embodiments, the printer starts in the second mode based on certain detections (for instance, type of document, size of document, material of the document, position of the document or a combination thereof). When the second mode is activated, the flap is in the second position so that the document can be conducted to the further roller arrangements and to the paper tray.

As in the first mode, the document is taken between the first roller arrangement 20a-21a, the second roller arrangement 20b-21b and the third roller arrangement 20c-21c. During the travel of the document, it is preferably aligned. During the travel of the document, it is preferably subject to scanning through the upper and/or the lower scanners 33u, 33l. Preferably, during the travel of the document in the second mode, it is preferably subjected to a magnetic reading (magnetic reader 34).

After the third roller arrangement, the document travel is deviated upwardly by the flap 41. The document D is then taken by the further roller arrangements 20d-21d and 20e-21e. Possibly, the document is red by the watermark reader 36.

The document D can be output in the upper try section 13u or in the lower try section 13l according to the position of the rotatable paper separator 43. The position of the paper separator 43 is driven by a signal coming from anyone of the magnetic reader 34, the upper scanner 33u, the lower scanner 33l, the watermark reader 36 or any combination thereof.

For instance, the operator could have the need to verify a number of bank checks and separate the valid checks from the invalid checks. Validation could be performed according to information received by the magnetic reader 34. This means that if a check is verified by the magnetic reader 34 and is considered to be valid, the paper separator 43 will be arranged in the corresponding valid position so that the valid check is arranged in the upper (or lower) tray (FIG. 7). On the contrary, if a check is verified by the magnetic reader and is not considered to be valid, the paper separator 43 will be arranged in the corresponding invalid position so that the invalid check is arranged in the lower (upper) tray (FIG. 6). The upper and lower trays allow to store a number of documents.

The invention claimed is:

1. A printer comprising:
   a single entrance through which one or more documents to be treated is introduced therein, the single entrance located on a front of the printer;
   a first path for transporting said one or more documents of a first type from a first position to a second position and back to the first position, the first position corresponding to the entrance through which the document to be treated is introduced;
   a second path for transporting said one or more documents of a second type from said first position to an exit, said second path comprises:
   a flap for deviating said one or more documents toward said exit,
   a first tray,
   a second tray, and
   a separator for directing the one or more documents to one of the first tray and the second tray;
   a first sensor for sensing the one or more documents; and
   wherein said flap is movable from a first flap position to a second flap position responsive to a signal from said first sensor, the first flap position allowing transport of the one or more documents along the first path, and the second flap position allowing transport of the documents along the second path.

2. The printer of claim 1, wherein said first signal is generated upon detection of any one of: type of the one or more documents, size of the one or more documents, material of the one or more documents, position of the one or more documents, validity of the one or more documents, or a combination thereof.

3. The printer of claim 1 wherein said first sensor is any one of a magnetic reader, an upper scanner, a lower scanner, a watermark reader or any combination thereof.

4. The printer of claim 1 wherein said first signal is from a user command.

5. The printer of claim 1, wherein said separator is moveable in response to a further signal, said further signal is a signal from any one of a magnetic reader, an upper scanner, a lower scanner, a watermark reader, or any combination thereof.

6. The printer of claim 1, wherein said separator is movable in response to a further signal, said further signal is a user command.

7. The printer of claim 1, wherein said printer comprises a control unit configured to receive any of said first signal or a further signal and emitting a command signal to a command device for rotating said flap and/or said separator.

8. The printer of claim 1, wherein said first path is horizontal such that the one or more documents are oriented horizontally, and said second path comprises a part of said first path.

9. The printer of claim 8, wherein said second path is configured so that said one or more documents is inclined with respect to said first path.

10. The printer of claim 1, wherein said exit is arranged in an upper portion of the printer.

11. The printer of claim 1, said first path comprises a back opening for allowing a front part of the document to exit from the printer when the document is at or in proximity of the second position.

12. The printer of claim 1, wherein said printer further comprises an automatic document feeder.

13. The printer of claim 1, wherein said printer further comprises an aligning device and a paper sensor.

14. The printer of claim 1, wherein said printer further comprises a dot-matrix printing head.

15. The printer of claim 1, wherein the document transported on the first path is a passport or passbook, and the document transported on the second path is a sheet.

16. A printer comprising:
- a front opening through which both of a first document of a first type and a second document of a second type different from the first type, to be treated are introduced therein, the front opening located on a front of the printer;
- a sensor for sensing the document;
- a first path for transporting the first document of the first type from a first position to a second position and back to the first position, the first position corresponding to the front opening through which the first document to be treated is introduced;
- a second path for transporting the second document of the second type from the first position to an exit, the second path comprises:
    - a flap for deviating the second document toward the exit,
    - a first tray,
    - a second tray, and
    - a separator for directing the second document to one of the first tray and the second tray;
- wherein the first document comprises a plurality of pages in a book arrangement, and the second document comprises a sheet.

* * * * *